United States Patent Office 3,663,617
Patented May 16, 1972

3,663,617
1-(ADAMANTYLMETHYLOXY) - 2 - HYDROXY-3-SUBSTITUTED AMINO PROPANES AND ACID ADDITION SALTS THEREOF
Andrea Pedrazzoli, Milan, and Leone Dall'Asta, Pavia, Italy, assignors to Societe d'Etudes de Recherches et d'Applications Scientifiques et Medicales E.R.A.S.M.E., Paris, France
No Drawing. Filed June 4, 1970, Ser. No. 43,582
Int. Cl. C07c 93/12
U.S. Cl. 260—563 P          7 Claims

ABSTRACT OF THE DISCLOSURE

Adamantane derivatives having the following general formula:

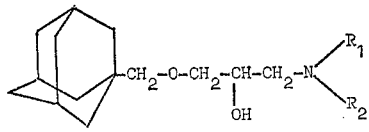

and their pharmaceutically acceptable acid addition salts are useful as sympaticolytic, myolitic, analgesic and, particularly, as local anaesthetic and β-adrenergic blocking agents. The novel compounds are prepared starting from 1 - hydroxy - methyl - adamantane through the new intermediate 1-(adamantyl-methyloxy) - 2,3 - epoxypropane.

BRIEF SUMMARY OF THE INVENTION

The present invention relates to novel derivatives of adamantane having the following general formula:

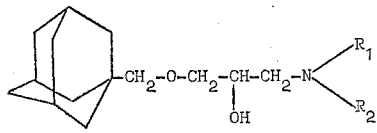

wherein $R_1$ is hydrogen or an aliphatic hydrocarbon radical having up to 8 carbon atoms, $R_2$ is an aliphatic hydrocarbon radical having up to 8 carbon atoms or a cycloalkyl radical of from 4 to 7 carbon atoms, or $R_1$ and $R_2$ are joined to form a pyrrolidino, piperidino, hexamethyleneimino, morpholino, N-lower alkyl piperazino, 2,2,5,5 - tetramethyl-pyrrolidino, 2,5 - dihydro - 2,2,5,5-tetramethylpyrrolino, 2,2,6,6 - tetramethyl-piperidino or 1,2,3,6 - tetrahydro - 2,2,6,6 - tetramethyl-pyridino group, $R_2$ being a cycloalkyl radical only when $R_1$ is hydrogen, and to pharmaceutically-useful salts of these compounds with inorganic or organic acids.

They have a remarkable pharmacological activity, in particular they are useful as sympathicolytic, myolitic, analgesic, and, particularly, as local anaesthetic and β-adrenergic blocking agents.

The invention is also concerned with a compound of formula:

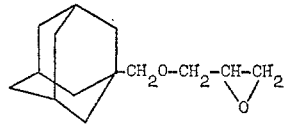

useful as an intermediate in the synthesis of the active products.

DETAILED DESCRIPTION

The term "aliphatic hydrocarbon radical having up to 8 carbon atoms", as used herein, includes straight or branched alkyl and alkenyl radicals having from 1 to 8 carbon atoms," as used herein, includes straight propyl, n-butyl, isobutyl, tert.butyl, n-pentyl, isoamyl, n-hexyl, 2-ethyl-butyl, n-heptyl, n-octyl, 2,2,4 - trimethylpentyl, allyl, crotyl, pent - 2 - enyl, pent - 3 - enyl. The term "lower alkyl" includes methyl, ethyl and propyl.

The novel compounds of this invention can be prepared starting from 1-hydroxy-methyl-adamantane according to the following reaction sequence:

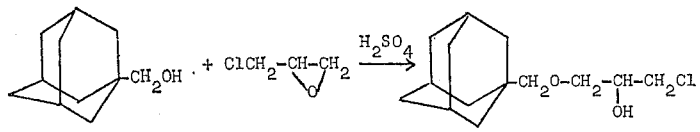

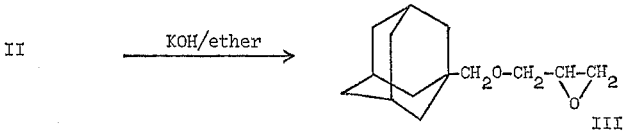

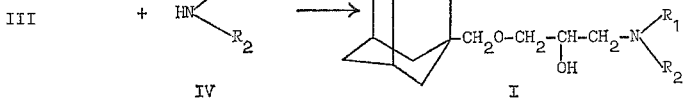

where $R_1$ and $R_2$ have the meaning defined above.

1 - hydroxy - methyl adamantane is reacted with epichlorhydrin in the presence of a catalytic quantity of concentrated sulfuric acid. The reaction is carried out at a temperature of 70–150° C., preferably 125° C., for a period ranging from 20–60 hours, preferably 45 hours. At the end of the reaction the compound II thus obtained is distilled under high vacuum and then reacted under stirring with powdered anhydrous alkali hydroxide, preferably potassium hydroxide, in anhydrous ethyl ether at room temperature for a time ranging from 10–40 hours, preferably 25 hours.

1 - (adamantyl - methyloxy) - 2,3 - epoxy - propane, III, is obtained by distillation under high vacuum.

1-(adamantyl-methyloxy)-2,3-epoxy-propane, which is a further object of the present invention, is then reacted with the appropriate amine IV in a polar solvent, such as straight or branched, saturated or unsaturated aliphatic alcohols containing 1 to 7 carbon atoms, preferably n-amyl or n-hexyl alcohol, at a temperature of 50–185° C., preferably 135–160° C. for a time ranging from 4–30 hours, preferably 15–22 hours. For those amines having a low boiling point, the reaction is effected in an autoclave. The derivatives of Formula I are isolated in the form of the base, purified by distillation in vacuo, and can be converted into their pharmaceutically acceptable acid addition salts by reaction with the appropriate acid according to methods well known in the art.

Exemplary pharmaceutically acceptable acid addition salts are those formed with acetic, maleic, fumaric, succinic, tartaric, citric, malic, cinnamic, sulfonic, hydrochloric, hydrobromic, hydriodic, sulfuric, phosphoric and nitric acids, the hydrochlorides being particularly preferred.

The compounds of the invention are stable to light and to heat. They have sympathicolytic, myolitic, analgesic and, particularly, local anaesthetic and β-adrenergic blocking activity and can be mixed with known pharmaceutical carriers for the produciton of pharmaceutical compositions.

PREPARATION 1-(adamantylmethyloxy)-2-hydroxy-3-chloro-propane

A solution of 198 g. of 1-(hydroxymethyl)-adamantane, 117 g. of epichlorhydrin and 1.2 ml. of concentrated sulphuric acid was heated at 115° C. for 45 hours. The small fraction which solidified was first distilled off and then the desired product, the boiling point of which is 120–125° C. at 0.2 mm. Hg was obtained.

EXAMPLE 1

1-(adamantylmethyloxy)-2,3-epoxy-propane

A suspension of 162 g. of 1-(adamantyl-methyloxy)-2-hydroxy-3-chloro-propane, 1300 ml. of ethyl ether and 105 g. of powdered anhydrous KOH was agitated for 20 hours at room temperature. The mixture was filtered through porous glass and then the solvent followed by the product were distilled off. 119 g. of 1-(adamantylmethyloxy)-2,3-epoxy-propane was obtained, the boliing point of which is 125–130° C./2 mm. Hg.

The infra-red spectrum in nujol gave: epoxide band at 846 (m.), 1160 (f.), 1250 (m.) cm.$^{-1}$: ether band at 1100 (f.) cm.$^{-1}$; OH band absent.

EXAMPLE 2

1-(adamantylmethyloxy)-2-hydroxy-3-isopropylaminopropane

A solution of 22 g. of 1-(adamantyl-methyloxy)-2,3-epoxy-propane, 15 g. of isopropylamine and 30 ml. of methanol was heated in an autoclave at 140° C. for 10 hours.

The autoclave was cooled, the mixture was distilled under vacuum and 21.5 g. of product was obtained having a boiling point of 140–145° C./0.3 mm. Hg.

EXAMPLE 3

1-(adamantylmethyloxy(-2-hydroxy-3(di-sec.butyl-amino)-propane

A solution of 27 g.of 1-(adamantyl-methoxy)-2,3-epoxy-propane, 26 g. of di-sec.butylamine and 20 ml. of amyl alcohol was heated at 135° C. for 20 hours. The mixture was concentrated and distilled in vacuo and 22 g. of 1-(adamantylmethyloxy) - 2-hydroxy-3-(di-sec.butylamine)-propane was obtained, the boling point of which is 160–163° C./0.1 mm. Hg.

EXAMPLE 4

1-(adamantylmethyloxy)-2-hydroxy-3-(2',2',5',5'-tertamethyl-pyrrolidino)-propane A solution of 22 g. of 1 - (adamantylmethyloxy)-2,3-epoxy - propane, 25 g. of 2,2,5,5-tetramethyl-pyrrolidine and 40 ml. of n-hexyl alcohol was heated at 155° C. for 18 hours. The mixture was concentrated and distilled in vacuo and 30.5 g. of 1-(adamantylmethyloxy)-2-hydroxy-3 - (2',2',5',5'-tetramethyl-pyrrolidino)-propane was obtained, the boiling point of which is 185° C./0.3 mm. Hg. The oil dissolved in isopropanol was treated with gaseous hyrogen chloride. The product was crystallised from isopropanol to obtain 28 g. of the hydrochloride in the form of white crystals, the melting point of which is 232–234° C.

EXAMPLE 5

By operating as described in Examples 2–4 the following compounds are obtained:

1 - (adamantylmethyloxy) - 2 - hydroxy-3-n-butylamino-propane, B.P. 182–186° C./0.05 mm. Hg (M.P. of its hydrochloride: 140–142° C.);

1 - (adamantylmethyloxy) - 2-hydroxy-3-sec.butylamino-propane, B.P. 170–175° C./0.05 mm. Hg (M.P. of its hydrochloride: 129–131° C.);

1 - (adamantylmethyloxy) - 2-hydroxy-3-tert.-butylamino-propane, B.P. 142–145° C./0.5 mm. Hg (M.P. of its hydrochloride: 160–162° C.);

1 - adamantylmethyloxy) - 2-hydroxy-3-n-octylamino-propane, B.P. 190–193° C./0.05 mm. Hg 1 - (adamantylmethyloxy) - 2-hydroxy-3-dimethylamino-propane, B.P. 155–160° C./0.4 mm. Hg (M.P. of its hydrochloride: 138–140° C.);

1 - (adamantylmethyloxy)-2-hydroxy-3-diisopropylamino-propane, B.P. 170–173° C./0.2 mm. Hg (M.P. of its hydrochloride: 202–204° C.);

1 - (adamantaylmethyloxy) - 2 - hydroxy-3-cyclopentyl-amino-propane, B.P. 180–185° C./0.2 mm. Hg (M.P. of its hydrochloride: 146–148° C.);

1 - (adamantylmethyloxy) - 2-hyroxy-3-cyclohexylamino-propane, B.P. 193–197° C. /0.5 mm. Hg (M.P. of its hydrochloride: 208–210° C.);

1 - (adamantylmethyloxy) - 2-hydroxy-3-morpholino-propane, B.P. 165170° C./0.2 mm. Hg. (M.P. of its hydrochloride: 167–168° C.);

1 - (adamantylmethyloxy) - 2-hydroxy-3-hexamethylene-imino-propane, B.P. 170–173° C./0.2 mm. Hg (M.P. of its hydrochloride: 193–195° C.);

1 - (adamantylmethyloxy)-2-hydroxy-3-(4'-methylpipera-zino)-propane hydrochloride, M.P. 220° C. (dec.);

1 - (adamantylmethyloxy) - 2 - hydroxy-3-(2',2',5',5'-tetramethyl - 2',5' - dihydro-pyrrolino)-propane, B.P. 184–188° C./0.2 mm. Hg (M.P. of its hydrochloride: 240–242° C.);

1 - (adamantylmethyloxy) - 2 - hydroxy-3-(2',2',6',6'-tetramethylpiperidino)-propane, B.P. 180–185° C./0.1 mm. Hg. (M.P. of its hydrochloride: 238–239° C.); and 1 - (adamantylmethyloxy - 2 - hydroxy - 3 - (2',2',6',6'-tetramethyl-1',2',3',6' - tetrahydropyridino) - propane, B.P. 185–190° C./0.3 mm. Hg (M.P. of its hydrochloride: 236–238° C.).

We claim:

1. A member selected from the group consisting of (a) a compound of formula:

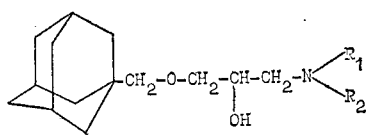

wherein $R_1$ is hydrogen or an aliphatic hydrocarbon radical having up to 8 carbon atoms and $R_2$ is an aliphatic hydrocarbon radical having up to 8 carbon atoms or a cycloalkyl radical of from 4 to 7 carbon atoms, $R_2$ being a cycloalkyl radical only when $R_1$ is hydrogen, and (b) a pharmaceutically acceptable acid addition salt thereof.

2. A member selected from the group consisting of 1 - (adamantylmethyloxy) - 2-hydroxy-3-isopropylaminopropane and a pharmaceutically acceptable acid addition salt thereof.

3. 1 - (adamantylmethyloxy) - 2-hydroxy-3-isopropylaminopropane hydrochloride.

4. 1 - (adamantylmethyloxy) - 2 - hydroxy-3-(di-sec-butylamino)-propane.

5. 1 - (adamantylmethyloxy) - 2 - hydroxy-3-n-butylamino-propane hydrochloride.

6. 1 - (adamantylmethyloxy) - 2 - hydroxy-3-sec-butylamino-propane hydrochloride.

7. 1 - (adamantylmethyloxy) - 2 - hydroxy-3-tert-butylamino-propane hydrochloride.

References Cited
UNITED STATES PATENTS
3,539,630  11/1970  Szinai et al. _____ 260—563 P X JOSEPH REBOLD, Primary Examiner D. R. PHILLIPS, Assistant Examiner U.S. Cl. X.R.

260—239 B, 247.7 E, 293.56, 294.7 C, 268 TR, 348 R, 501.1, 611 F; 424—244, 248, 250, 263, 267, 274, 325

UNITED STATES PATENT OFFICE
CERTIFICATE OF CORRECTION

Patent No. 3,663,617    Dated  May 16, 1972

Inventor(s) Andrea Pedrazzoli and Leone Dall'Asta

It is certified that error appears in the above-identified patent and that said Letters Patent are hereby corrected as shown below:

Column 2, line 22, cancel "," as used herein, includes straight" and substitute --such as methyl, ethyl, n-propyl, iso- --

Column 3, line 64, cancel "butylamine" and substitute --butylamino--.

Column 4, line 5, cancel "hyrogen" and substitute --hydrogen-- line 6, cancel "obtaind" and substitute --obtain-- line 33, cancel "hyroxy" and substitute --hydroxy--.

line 37 cancel "165170" and substitute --165-170--.

Signed and sealed this 10th day of April 1973.

(SEAL)
Attest:

EDWARD M. FLETCHER, JR.    ROBERT GOTTSCHALK
Attesting Officer           Commissioner of Patents